V. G. APPLE.
POTENTIAL REGULATOR FOR DYNAMO ELECTRIC MACHINES.
APPLICATION FILED MAY 31, 1911.
1,100,340. Patented June 16, 1914.
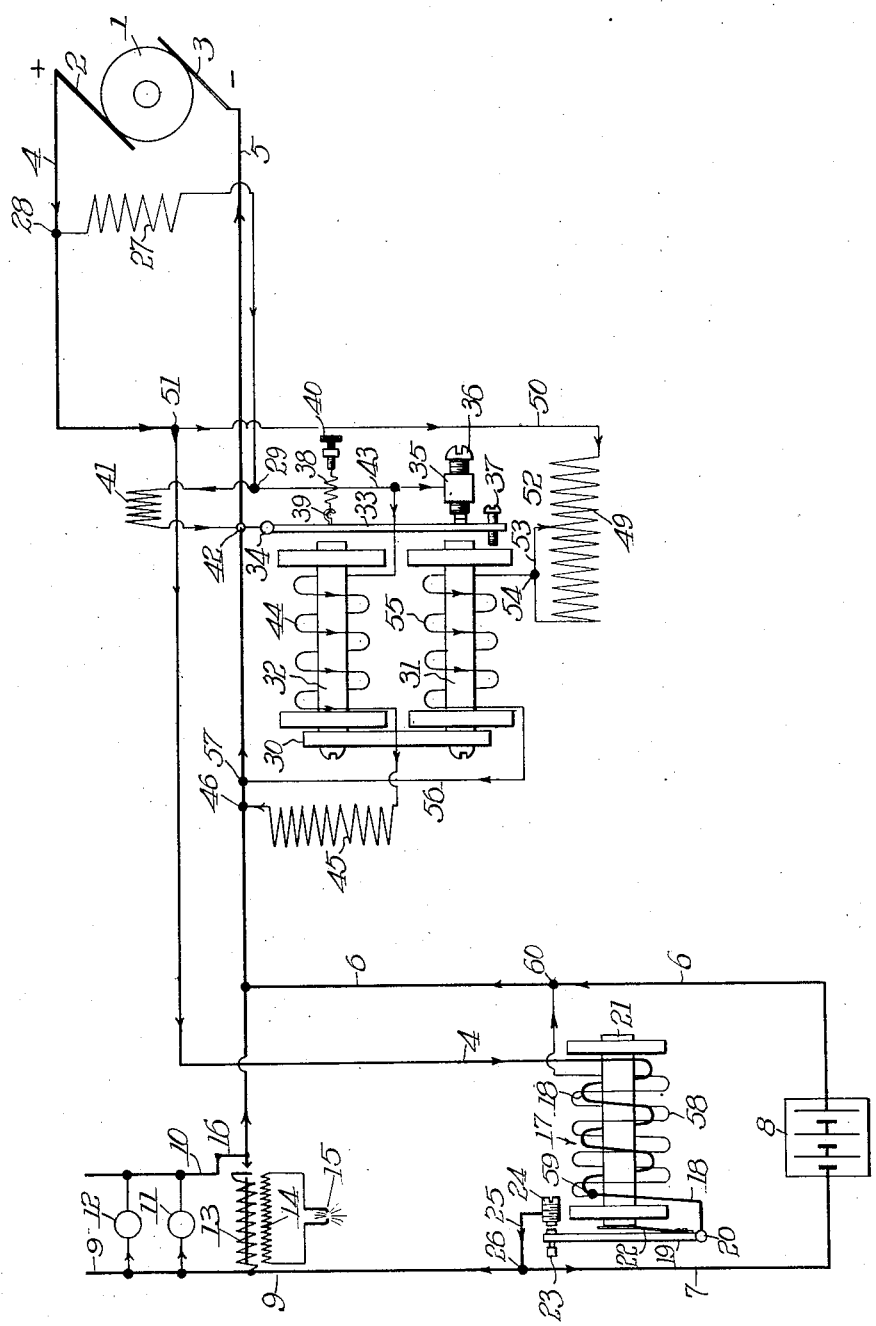

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

POTENTIAL-REGULATOR FOR DYNAMO-ELECTRIC MACHINES.

1,100,340.      Specification of Letters Patent.      Patented June 16, 1914.

Application filed May 31, 1911. Serial No. 630,419.

*To all whom it may concern:*

Be it known that I, VINCENT G. APPLE, a citizen of the United States, residing at Dayton, in the county of Montgomery and State of Ohio, have invented certain new and useful Improvements in Potential-Regulators for Dynamo-Electric Machines, of which the following is a specification.

My invention relates to improvements in potential regulators for dynamo electric machines.

One of the objects of my invention is to automatically maintain, substantially, constant the difference of potential, at the terminals of a dynamo electric machine, and especially of machines of this class that are driven by power-producing motors, operating at great variations of speed. I attain this object by causing magnetic variations in the dynamo electric machine as by setting up current undulations, directly in the field magnetizing circuit of the machine after the speed of the armature thereof has reached, or exceeded, a predetermined velocity, and by varying the extent and frequency, and increasing the effectiveness of such undulations, operatively proportional to the increased velocity of the armature, beyond its predetermined critical speed, in conjunction with the reactive effects, produced by tendency toward increased current production circulating in the armature, upon the field magnets of said dynamo electric machine.

In the operation of my system, after the armature of the dynamo has reached a predetermined speed, the magnetizing current, employed for energizing the field coils, is maintained sufficiently disturbed by pulsations, of greater or less frequency, or of varying time factors, as the velocity of the armature increases beyond that predetermined degree so as to set up the necessary reactions, the results of which are to maintain the current in the working circuit substantially constant without material change of the electromotive-force, at the terminals of the armature, thereby to maintain it at substantially constant value independently of variations in or the excessive speed at which the armature may be driven.

Other and further objects of my invention will become readily apparent, from a consideration of the following description, taken in conjunction with the drawing, wherein a schematic representation of the circuits shows, diagrammatically, the arrangement, construction and association of the parts necessary to carry my means of regulation into effect.

The dynamo-electric machine, with which I have shown my means of regulation in the accompanying drawings, is of that type, known in the art, as "shunt wound" wherein the field is energized by an electric coil connected across the terminals of the dynamo. If the current, in the field magnetizing coil, of such a machine remains undisturbed, then the electro-motive-force of the machine with unchanging load will be, to some extent, proportional to the velocity of the armature. It is to maintain a constant electro-motive force of the armature, after the speed of the machine has reached a predetermined velocity that the results of my invention are attained.

In association with, and as a part of my system, I employ a storage battery, or accumulator, that is adapted to float upon the line after the electro-motive-force of the dynamo-electric machine has reached a certain value, due to its speed. The battery is then cut into circuit with the dynamo, and after the electro-motive-force of the dynamo has fallen below the predetermined speed, at which the battery is to be cut into the main circuit, the battery is automatically cut out or removed from the circuit with the dynamo but is still maintained in circuit with the translating devices which are common both to the dynamo and to the battery.

My system of regulation is especially desirable to be used in connection with lighting and ignition plants operated by the motive engine of an automobile, and in connection with train lighting wherein the driving motor, constituting the source of power, is adapted to be rotated at greatly varying speed.

In installing the apparatus necessary to carry out my system of regulation, I prefer to gear the dynamo-electric machine directly to the engine employed to drive the automobile at such ratio that the electro-motive-force desired to be maintained of constant value is reached at the time when the engine has arrived at a speed at which it is normally maintained during the greatest time of its service, and when the engine is speeded beyond this point, the regulating means, so operates with respect to the dynamo electric machine, as to prevent its increase of electro-motive-force beyond the predetermined value, to any material extent.

The armature of the constant potential dynamo-electric machine is represented by 1 and the positive and negative brushes, which bear on the commutator thereof, by, 2, and 3, respectively. Main service wires, 4, and 5, are connected to the brushes, 2, and 3, respectively. To the wire 5, is connected a wire 6, between which, and the wire 7, a storage battery 8, is included. The prolongation of the wire 7, constitutes one of the working mains 9, between which and the main 10, the translating devices, that are to be supplied with current, by the joint use of the dynamo-electric machine and the storage battery, are connected.

11, and 12, are incandescent lamps, of which there may be any desired number, within the capacity of the current producers, and 13 is primary of an induction coil; the secondary 14, of which, is connected to the terminals of the spark plug 15. The main, 10, is connected to wire 5, as at 16. An automatic switch, 17, is provided, with a coil, through which the working current produced by the dynamo passes. The coil 18, of said switch, is connected to the pivotal armature 19, as at 20. Between the core 21, of the switch magnet, and the armature 19 is a retractile spring, 22, which normally bears against the end of the magnet core and yieldingly holds the armature in contact with a back stop 23. When the switch magnet 17 is energized, it attracts its armature 19, which is adapted to make electrical connection with the adjustable contact screw 24. The latter is connected, by wire 25, to the wire 7, as at 26. Several shunts, or subsidiary circuits I shall now trace. The shunt-field magnet-winding 27 is connected to the main wire 4, as at 28, the other end, or terminal, of the field winding, being connected to a point 29. The regulating magnet, consists of the usual magnetic device, comprising yoke, 30, and the cores 31 and 32, having a responsive armature 33 pivoted as at 34. A block 35, is screw-threaded, for the reception of an adjustable contact screw 36, with which the armature 33, makes contact, when in retracted position. An adjustable screw, 37, limits the forward movement of the armature. A retractile spring 38, is connected to the armature 39, and its strength is adapted to be adjusted by the screw 40. A resistance coil, 41, is connected between the point 29 and the wire 5, as at 42. The coil 41 is of much higher resistance, preferably, than the resistance of the field winding 27. In an example which has proven quite satisfactory, the resistance of coils 41 was ten times the resistance of the field winding 27. A wire 43 connects the point 29 to the block 35, supporting the contact screw 36, which makes contact with the retracted armature 33. A coil 44, surrounds the core 32 of the regulating magnet, and is connected at one end to the wire 43, and at the other end to the rheostat, or resistance 45, the latter having its other terminal connected to wire 5 as at 46.

The resistance, 45, is relatively high. In the example, which has proved quite satisfactory to the applicant, this resistance was something near ten times greater than the resistance of the coil 41 and about one hundred times greater than the resistance of the field magnet windings. An adjustable rheostat, or resistance, 49, is connected to one of the main wires, 4, by wire, 50, as at 51. The contact 52, by means of which any desired portion of the resistance, 49, may be included in circuit, is connected by wire 53 to a point 54. A coil, 55, surrounds the core, 31, of the regulating magnet, and is connected to point 54, the other end of coil 55 being connected by wire 56 to the main 5, as at 57. Throughout the circuits, I have shown, by arrows, the direction of the current from the dynamo, and it will therefore be observed that the coils 55 and 44 are opposed when energized. The automatic switch, or cutout, 17 is provided with a subsidiary reinforcing coil 58, one terminal, of which, is connected to the terminal of the coil 18 as at 59, the other terminal being connected to the wire 6, as at 60.

When the dynamo is set in operation, that is to say, when its armature is rotated, by the proper means, the circuit will be complete through the field magnet windings 27, as follows: starting at the point 28 from the wire 4, through the field magnet coil 27 to the point 29, thence over wire 43 to the block 35, and through the armature 33 to the main wire 5; thus completing the circuit through the field windings without the inclusion of any extraneous resistance. This will be the field winding circuit at the time, previous to, or when the armature is being driven at the normal speed at which it will generate the electro-motive-force desired to be maintained. Now, when the electro-motive-force rises, above normal value, as a result of increased speed of the dynamo, or otherwise, current, sufficient to operate the regulator, will then pass from wire 4, over the wire 50, through the adjusted resistance 49, through the coil 55, and thence to the wire 5. It will be observed that, at the time, there is no material current passing through coil 44, due to the short circuit, effected by the armature 33 and contact screw 36. When current, of sufficient value, has passed through the coil 55, due to a slight excess in electro-motive-force, the armature, 33, will be attracted by the magnetism induced in the core 31, by the coil 55, and the contact will be broken between the armature 33 and the screw 36, thus permitting the current to pass from wire 43, through coil 44, and through the resistance 45, to the wire 5, at point 46. In the first instance, the armature 33, has been moved toward the core 31, against the retractile spring 38, after which, the coil 44, is thereby admitted into the circuit, as just pointed out. Now it will be observed that the direction of current, through coil 44, is such, as to neutralize the magnetic effect produced by coil 55, and therefore the retractile spring 38 is sufficient to draw the armature 33 again into contact with the screw 36, thus cutting out the coil 44 and also short-circuiting resistance coil 41, at the same time, thus again increasing the current through the field magnet coil 27. Coil 44 being removed from the circuit, coil 55 once more attracts the armature 33 and the operation is repeated. The diminution of the electro-motive-force, by admission of coil 41 in the field magnet circuit and short circuiting thereof through the operation of the regulating magnet described, produces very active and positive variation of the current supplied to the field magnet windings. By this means the circuit is never broken in the field magnet windings and therefore there is no discharge at the contacts between the armature 33 and the screw 36, but the resistance of the circuit, through the field magnet windings 27 is increased, from about three ohms, to something like thirty ohms, thereby causing violent current undulations to pass through the field magnet windings, and corresponding magnetic impulses are engendered in the field cores of both magnets. Thus it will be seen that the circuits remain closed between the contacts 33 and 36 until the speed of the dynamo, and its consequent electromotive-force, rises above the critical point. Then the coil 55 attracts its armature 33 opening the circuit between contacts 33 and 36, thereby admitting the rheostat 45 in circuit with the coil 44 of the regulating magnet, which is in series circuit with the field windings, and in parallel circuit with coil 41 thereby reducing the current circulating through the field magnet winding and consequently its magnetizing power.

The higher the speed of the dynamo, above the critical, the greater will be the tendency, and as a matter of fact the greater will be the actual disturbance produced in the magnetic field and the armature to oppose further rise of electro-motive force.

The electrical impulses, superinduced by the opening of the contacts 33 and 36, and the current surging through the field coils 27, set up counteracting self-induction or impedance effects in the field coils, which thereby reduce the current below that which would otherwise flow through the said coils.

The increase in the value of the current, due to the increase in electro-motive-force, reacts upon the armature, and also contributes toward the reduction of rise of the electro-motive-force due to the increased speed of the armature. The rapid changes of the magnetic intensity of the field magnet, effected by the electric impulses produced by the regulating magnet, produces hysteresis in the iron portion of the field magnets and this effect produces Faucault currents in the magnetic mass, thereby inducing a magnetic field reaction by the armature, and eddy currents in the inductor itself, all of which effects tend to reduce the electro-motive-force impressed upon the brush terminals of the dynamo armature to such an extent as to maintain substantially constant the electro-motive-force of the armature, independently of the speed variations, above the certain predetermined critical point. These effects are obviously intensified when the speed of the armature is increased above that at which it is adjusted to operate.

Now, referring to the operation of the automatic switch or cut-out 17, it will be observed, that the coil 58, is in shunt across the wires 4 and 5, including the coarse winding, or the coil 18. When the electromotive-force of the dynamo is of the desired value, at which it is to be maintained, the current, that passes through the coils 58, is sufficient to attract the armature 19, against the resilient action of the spring 22, so that the armature 19 makes contact with the screw 24, thereby completing the main circuit from the wire 4, through the coil 18, thus reinforcing the magnetic effect produced by the coil 58, and holding the armature 19, in more firm contact with the screw 24. If the electro-motive-force of the armature of the dynamo dominates that of the battery 8, then the current will pass from the wire 4 through the coil 18, and through the armature 19 by wire 25, to the wire 7; a portion of the current then passing to the battery 8 to charge it, to an extent in accordance with the difference of their electro-motive-forces, and the other portion passing through the main 9, and the translating devices, bridged therebetween to the main 5. When the electro-motive-force of the dynamo falls below the predetermined electro-motive-force at which it is to be maintained, then current from the battery 8 will pass through the coil 18, in the opposite direction, overcoming the magnetic effect of the coil, 58; deënergizing the core 21, and the armature 19 will be retracted by the spring 22, and break contact with the screw 24, thereby disconnecting the dynamo from the circuit, but leaving the battery in circuit with the translating devices for which it may supply current quite independently of the dynamo, and thus removing the dynamo from the danger of being burned out by the current that would otherwise pass through the armature of the dynamo. This being of relatively low resistance, when not under speed, a large current would have the effect of overburdening the wires of the armature and thereby destroy it.

In a system, in substantial accordance with that of the diagram and the foregoing explanation, wherein the dynamo generated an electro-motive-force of 7½ volts and the battery had an electro-motive-force of about 7 volts, the armature of the dynamo would run at varying speeds to an extent more than equal double the critical speed, at which the normal voltage was generated, and the regulator operated in every way in the manner heretofore described, to maintain constant electro-motive-force under such greatly varying speeds.

Whatever may be the contributing causes to produce the results described, whether hysteresis; armature reaction; magnetic variation, or counter electro-motive-force, due to the undulations of current in the field magnet; the fact remains that the results are produced, and I have given herein the causes which, in my opinion, have contributed to the results pointed out, but I do not desire to be understood as specifically stating that all of these effects are produced, or that any one of them contribute to a greater extent than another. I have given, only my opinion, and I am aware that considerable variation may be made from the exemplification which I have heretofore disclosed without departing from the spirit of the invention and within the scope of the appended claims.

What I claim is:

1. The combination with a dynamo electric machine having main wires and a field circuit, of a rheostat, of resistance substantially greater than the field windings of said dynamo; a short circuiting device, for said rheostat; two differentially wound coils for controlling said short-circuiting device; and a second rheostat, in series with one of said coils and of resistance substantially greater than the first mentioned rheostat, the other of said coils bridging said main terminals of the dynamo, and circuit connections providing a plurality of parallels in series with said field circuit winding, one said parallel including the first mentioned rheostat, another including said short-circuiting device, and another including the differentially wound coil and the second rheostat in series.

2. The combination with a dynamo electric machine having main terminals and a field circuit winding, of a rheostat, of resistance approximately ten times that of the field winding of said dynamo; a short-circuiting device; a controlling and differentially wound coil for controlling said short-circuiting device, and a second rheostat, of resistance approximately ten times the first mentioned rheostat, one of said differentially wound coils bridging the dynamo terminals, and short circuiting connections, providing a plurality of parallels in series with said field winding circuit, one of said parallels including the first mentioned rheostat; one said parallel including said short-circuiting device, and one said parallel including the differentially wound coil and the second mentioned rheostat, in series.

In testimony, whereof I hereunto set my hand in the presence of two witnesses.

VINCENT G. APPLE.

In the presence of—
N. E. Snyder,
E. V. Martin.